United States Patent [19]

Greenwood

[11] 4,403,190

[45] Sep. 6, 1983

[54] MAGNETIC RESONANCE GYROSCOPE WITH SPECTRAL CONTROL

[75] Inventor: Ivan A. Greenwood, Stamford, Conn.

[73] Assignee: The Singer Company, Little Falls, N.J.

[21] Appl. No.: 245,826

[22] Filed: Mar. 20, 1981

[51] Int. Cl.³ .......................................... G01R 33/08
[52] U.S. Cl. ................................................. 324/304
[58] Field of Search ........................ 324/300, 304, 301

[56] References Cited

U.S. PATENT DOCUMENTS

| | | | |
|---|---|---|---|
| 3,778,700 | 12/1973 | Bayley | 324/304 |
| 3,863,144 | 1/1975 | Simpson et al. | 324/304 |
| 3,873,908 | 3/1975 | Young | 324/304 |
| 4,147,974 | 4/1979 | Greenwood | 324/304 |

*Primary Examiner*—Michael J. Tokar
*Attorney, Agent, or Firm*—Morris Liss; Thomas W. Kennedy

[57] ABSTRACT

A magnetic resonance gyroscope wherein the pump lamp includes an isotopic mixture of Hg, which controls the optical spectra of the pump beam to eliminate $^{201}$Hg alignment moments and to reduce light-induced frequency shifts. The inclusion of quarter-wavelength plates, reflection polarizers, and adjustable magnetic fields acting on the pump and readout lamps permit fine tuning control over the respective spectra to further enhance the rate bias stability of the gyroscope.

5 Claims, 5 Drawing Figures

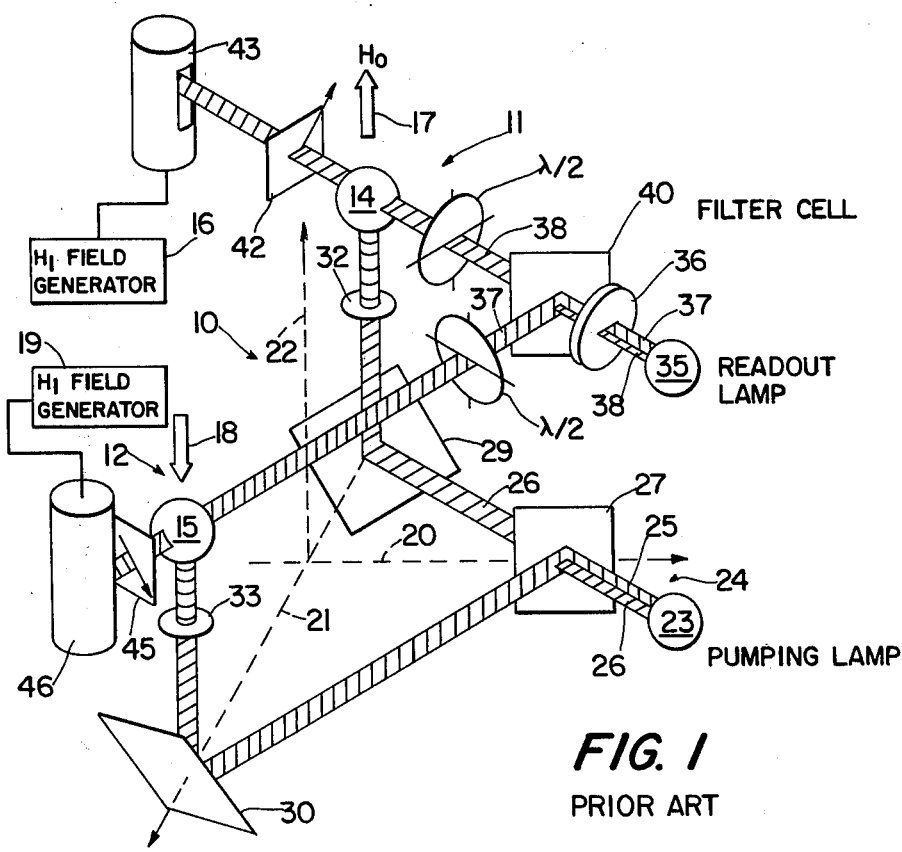
FIG. 1
PRIOR ART
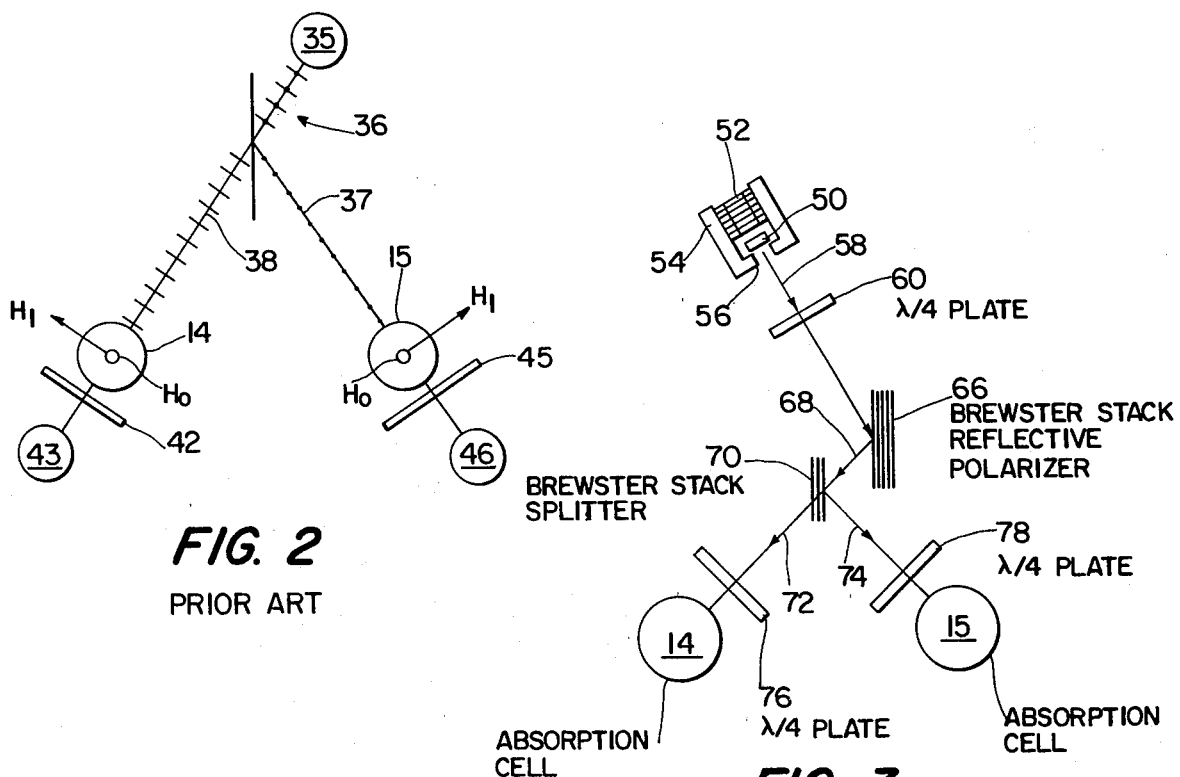
FIG. 2
PRIOR ART
FIG. 3

MAGNETIC RESONANCE GYROSCOPE WITH SPECTRAL CONTROL

The Government has rights in this invention pursuant to Contract No. N00019-78-C-0532 awarded by the Department of the Navy.

FIELD OF THE INVENTION

The present invention relates to gyroscopes and more particularly to a nuclear magnetic resonance gyroscope.

BRIEF DESCRIPTION OF THE PRIOR ART

The prior art includes a number of nuclear magnetic resonance gyroscopes which obtain rotational information from the phases of precessing nuclear magnetic moments. Examples of such art include U.S. Pat. Nos. 3,778,700 and 4,047,974, both of which are assigned to the present assignee. A type of magnetic resonance gyroscope for which the present invention serves as an improvement is the structure disclosed in the mentioned U.S. Pat. No. 3,778,700. In that patent, a gyroscope is disclosed which comprises nuclear magnetic resonance means, including a pair of spin generators, for generating the nuclear magnetic resonant signals in circuit with means for comparing the phases of the nuclear signals from each spin generator for providing an output signal proportional to the angle of rotation. Each spin generator comprises a mercury absorption cell containing $^{199}$Hg and $^{201}$Hg which is subjected to a DC magnetic $H_o$ field and to an AC $H_1$ magnetic field in a direction perpendicular to the $H_o$ field. Each mercury absorption cell in each spin generator is optically pumped by a circularly polarized beam of light at a wavelength having an optical center at 253.7 nm. The pumping beam for each cell is provided from a randomly polarized beam of light produced by a common pumping lamp and is separated into its planar polarized components by a Brewster angle polarizer. The linearly polarized beams of light are reflected to intersect the absorption cells in each spin generator and are circularly polarized by properly oriented quarter-wave plates. The readout beams for each spin generator are derived from a second conventional lamp and are separated into two linearly polarized beams by a second Brewster angle polarizer. The beams then respectively intersect the mercury absorption cells. Each readout beam passes through the absorption cell wherein its plane of polarization is oscillated by the Faraday effect at the Larmor frequency. The readout beams are converted to amplitude modulated beams in a linear analyzer which provides a periodic amplitude varying signal to a photodetector circuit. An $H_1$ field generator is in circuit with the photodetector for generating the $H_1$ field for the absorption cell in each associated spin generator. Readout and control circuit means are provided for comparing the phases of the two resonance signals produced by the isotopes of mercury of each absorption cell to produce an error signal for controlling the $H_o$ field generator of one of the cells to maintain its $H_o$ equal to the $H_o$ of the other cell, and to provide an output signal representing the rotation of the gyroscope about the sensitive axis determined by the direction of the $H_o$ fields.

Although this type of gyroscope serves as a basis for the present invention and operates with generally satisfactory results, it has been found that, unless certain refinements are made to the pump and readout beam, $^{201}$Hg alignment moments and light-induced-frequency shifts (LIFS) are significant and add to the drift terms at the output of the gyroscope. As a result, the accuracy of the gyroscope may be affected.

BRIEF DESCRIPTION OF THE PRESENT INVENTION

The present invention includes a number of refinements to the pumping and readout beams which results in control of the beam spectra. A primary improvement is the utilization of particular isotope compositions in the pump lamp. Additional refinements may include the adding of an adjustable Zeeman splitting magnet to the pump lamp which splits each pump lamp spectral line into two or more lines. By adding a quarterwavelength plate and a reflection polarizer, the relative intensities of the Zeeman split lines can be changed. Spectral control of the pump beam results which reduces or eliminates $^{201}$Hg alignment moments and reduces the effects of light-induced-frequency shifts, thereby improving the rate bias stability. These additional refinements in a multiple cell gyroscope also lead to reduced differential intensity response to lamp spectral shifts and lamp polarization changes, further improving rate bias stability. Except for the reduction of alignment moments, a similar set of improvements holds when the same refinements are incorporated in the readout beam.

Although the present invention is described in terms of gyros utilizing $^{199}$Hg and $^{201}$Hg in a pair of absorption cells, the validity of the invention is believed to cover any case where one or more spin particles have spin greater than one half.

In summary, the present invention has as its main feature the control of spectral features to suppress alignment moments permitting the previously discussed advantages simultaneous with the achievement of LIFS$_{199}$/LIFS$_{201}$ approaching $\gamma_{199}/\gamma_{201}$ and intensity division independent of lamp polarization.

The above-mentioned objects and advantages of the present invention will be more clearly understood when considered in conjunction with the accompanying drawings, in which:

BRIEF DESCRIPTION OF THE FIGURES

FIG. 1 is a schematic view of the prior art showing the central components arranged in their proper geometrical relationship.

FIG. 2 is a schematic of the readout beam shown for the prior art of FIG. 1.

FIG. 3 is a schematic of the optical configuration for the pump beam, as included in the present invention.

DETAILED DESCRIPTION OF THE INVENTION

Figure 4:
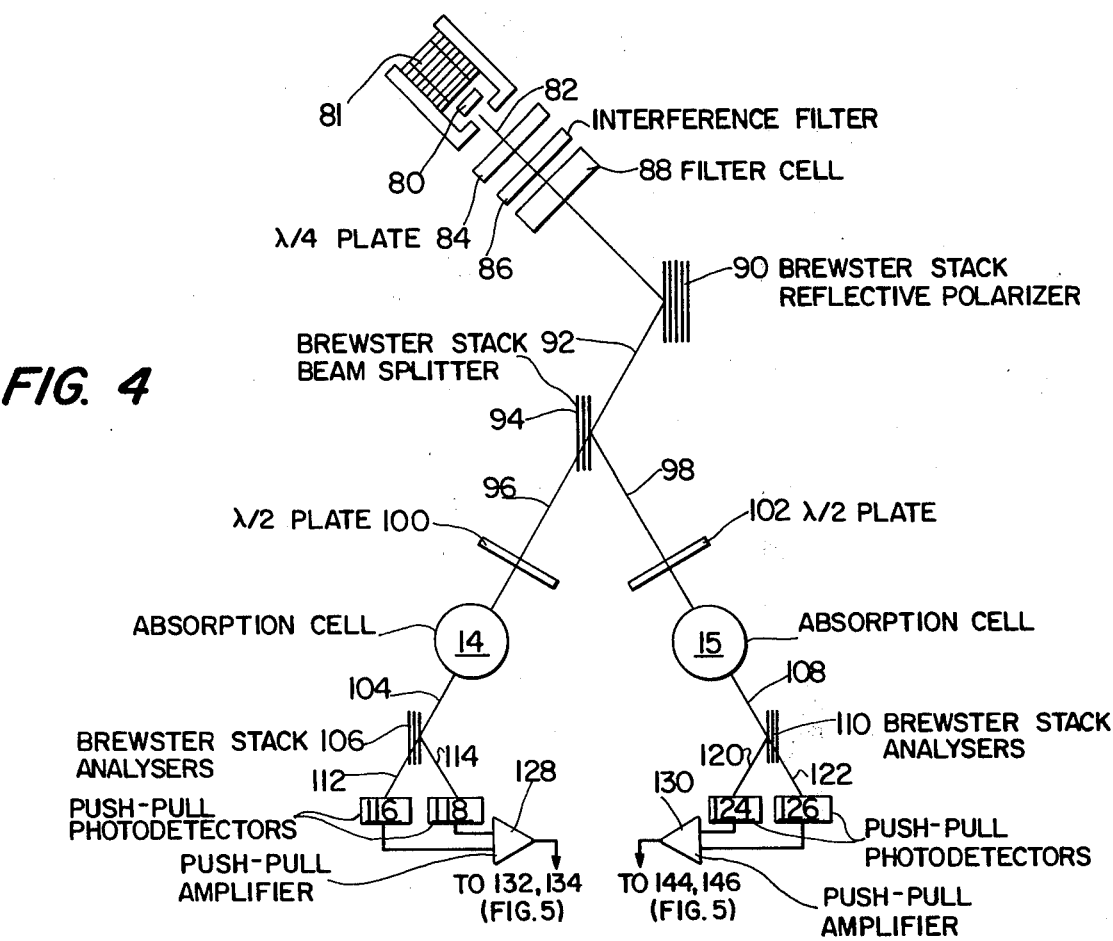
FIG. 4 is a schematic of the optical configuration for the readout beam, as included in the present invention.

FIG. 1 illustrates the basic configuration of the prior art gyroscope described in the previously mentioned U.S. Pat. No. 3,778,700. The gyroscope is generally indicated by reference numeral 10 and comprises a first spin generator designated generally by the reference numeral 11 and a second spin generator designated generally by the reference numeral 12. Each spin generator acts as a basic sensing unit for the gyroscope and serves as an oscillator which effectively simultaneously operates at two frequencies, $\omega_1$ and $\omega_2$. The output frequencies of each spin generator are influenced by the rate of rotation of the gyroscope about the predetermined sensitive axis 22 so that the angle of rotation is added algebraically to the phase of each oscillation from the spin generator. Each output frequency of each spin generator is proportional to its magnetic field, $H_o$, so that the ratio of the frequencies in each spin generator remains constant in the absence of rotation.

The phases of the oscillation signals from each spin generator are given by the following equations:

$$\phi_{11} = \int \gamma_1 H_{01} dt + \phi_0$$

$$\phi_{21} = \int \gamma_2 H_{01} dt - \phi_0$$

$$\phi_{12} = \int \gamma_1 H_{02} dt - \phi_0$$

$$\phi_{22} = \int \gamma_2 H_{02} dt + \phi_0 \qquad (1)$$

where $\gamma_1$ and $\gamma_2$ are the absolute gyromagnetic ratios of the Hg nuclei in the absorption cell; $H_{01}$ and $H_{02}$ are the respective magnetic fields proportional to the current applied to the coils which produce the fields; $\phi_0$ is the common angle of rotation of the spin generators about the predetermined sensitive axis; $\phi_{11}$ and $\phi_{21}$ are the phases of the output signals from spin generator 11 and $\phi_{12}$ and $\phi_{22}$ are the phases of the output signals of spin generator 12; and $\phi_{11}$ and $\phi_{12}$ are the phases of the signals whose frequency is $\omega_1$, while $\phi_{21}$ and $\phi_{22}$ are the phases of the signals whose frequency is $\omega_2$.

The angle of rotation is obtained by comparing the phases of pairs of signals. Neglecting error terms, if the phase difference in the signals of one frequency from the two spin generators is maintained equal and opposite in sign to the phase difference between the signals of the other frequency, the phase difference at either frequency is twice the angle of rotation of the gyroscope about the sensitive axis. Thus, if $$(\phi_{11} - \phi_{12}) + (\phi_{21} - \phi_{22}) = 0 \qquad (2)$$

then $$\phi_{11} - \phi_{12} = 2\phi_0 \text{ and } \phi_{21} - \phi_{22} = 2\phi_0 \qquad (3)$$

The condition of equation (2) above may be maintained by developing an error signal from the sum of the respective phase differences of the corresponding outputs from the two spin generators. The error signal is used as a differential control signal to control the current through one or more coils which generates the $H_o$ magnetic fields to maintain the error signal at a null. This forces $H_{01}$ to equal $H_{02}$.

The gyroscope 10 includes circuitry shown in FIG. 5 which will be discussed in greater detail for comparing the phases of the output signals from the two spin generators 11 and 12 and for generating control and output signals as described above. The output signal produced is proportional to the angle of rotation of the gyroscope 10 about the sensitive axis.

The spin generator 11 includes an optically pumped and an optically monitored magnetic resonance element which comprises a coil assembly (not shown in FIG. 1) having a mercury absorption cell 14 at its center. Similarly, the spin generator 12 includes a mercury absorption cell 15 located at the center of a multiple coil assembly (not shown in FIG. 1). A first field coil (not shown) generates a DC magnetic $H_o$ field designated generally by the reference numeral 17, for the spin generator 11 while a second field coil (not shown) generates a second DC magnetic $H_o$ field, designated generally by the reference numeral 18, for the spin generator 12.

For clarity, the orientation of the components in the apparatus shown in FIG. 1 will be related to an arbitrary x, y, z-axis coordinate system to aid in visualizing the spatial relationship of the components and to indicate the polarization of the pumping and readout light beams which will be described in detail. The x, y, and z-axes are designated generally by the reference numerals 20, 21 and 22, respectively. Thus, the $H_o$ field 17 is in the positive z direction, while the $H_o$ field 18 is in the negative z direction, so that the field 18 is thus antiparallel to the field 17.

Each of the mercury absorption cells 14 and 15 preferably contains two odd isotopes of mercury, i.e., $^{199}$Hg and $^{201}$Hg. When the DC $H_o$ magnetic field has a strength of about 1.3 gauss, the resonance frequency of $^{199}$Hg is approximately 1 kHz and the resonance frequency of $^{201}$Hg is about 369 Hz. When each mercury cell is illuminated by light in a waveband having a nominal optical center at 253.7 nm, the mercury atoms in the cell may absorb light in this region and be excited from the ground state to the first excited level by any light at a wavelength which is in resonance with transitions from the ground state mercury atoms in the mercury cell.

The ground state atoms of mercury in each absorption cell possess magnetic moments due only to their intrinsic nuclear angular momentum or spin properties, since all electronic moments cancel out. When a collection or ensemble of such spins is subjected to the influence of a substantially homogenous static magnetic field $H_o$, the orientations of the magnetic moments will be quantized or split into a series of ground states or levels having predeterminable energy separations. In the absence of very strong magnetic fields or optical pumping, the moments are randomly distributed and produce no net magnetic moment. A macroscopic magnetic moment may be produced in the mercury vapor by the process of optical pumping. Circularly polarized light of precise wavelengths to be absorbed by the mercury atoms adds its angular momentum to the mercury atoms when it is absorbed. Some of this angular momentum remains behind when the excited atoms reemit the absorbed electronic excitation energy. This corresponds to a redistribution of population among the ground state magnetic quantum levels. For $^{199}$Hg, there are only two such levels, $m_f = \pm \frac{1}{2}$, and any asymmetry of populations corresponds only to an orientation moment, with a resultant macroscopic nuclear magnetic moment. For $^{201}$Hg, having a nuclear spin of 3/2, there are four levels, $m_f = \pm 3/2$ and $\pm \frac{1}{2}$. For such atoms, the orientation moment is proportional to $3(n_{+3/2} - n_{-3/2}) + (n_{\frac{1}{2}} - n_{-\frac{1}{2}})$, where the n's represent the populations in the respective magnetic levels. Again, the orientation moment is observable as a net magnetic moment. There is also an alignment moment proportional to $(n_{3/2} + n_{-3/2}) - (n_{\frac{1}{2}} + n_{-\frac{1}{2}})$. The alignment moment leads to a variety of effects in the magnetic resonance gyro, most of them tending to produce errors in rate.

A pumping lamp 23 provides a beam 24 of randomly polarized absorbable light which may be resolved into components polarized in a first plane designated by the numeral 25 and in a second plane designated by the numeral 26. The light output from the lamp 23 is directed upon a Brewster angle polarizer 27 which also acts as a beam splitter. The components of the light in the plane 26 are transmitted therethrough and are reflected from a mirror 29 in a direction parallel to the z axis 22. The components of the light in the plane 25 are reflected from the Brewster angle polarizer 27 and are reflected from the mirror 30 in a direction parallel to the z axis 22. The linearly polarized light reflected from the mirror 29 is circularly polarized by the quarter-wave plate 32 and intersects the mercury absorption cell 14, where it performs the function of optical pumping. The linearly polarized light reflected from the mirror 30 is circularly polarized by the quarter-wave plate 33 and intersects the mercury absorption cell 15, producing optical pumping in this cell.

A readout lamp 35 produces a beam of randomly polarized off-resonance light which contains components of light polarized in the plane designated by the reference numeral 37 and light polarized in the plane designated by the reference numeral 38. The beam from the lamp 35 undergoes filtering by a filter cell 36 containing $^{199}$Hg and $^{201}$Hg atoms. The filtered beam then intersects the Brewster angle polarizer 40 which transmits the components of light polarized in the plane 38 to intersect the mercury cell 14. Similarly, the components of light polarized in the plane 37 in the readout beam are reflected from the Brewster angle polarizer 40 and intersect the mercury absorption cell 15.

The geometry shown in FIG. 1 is determined in large part by the Brewster angle. Preferably, each Brewster angle polarizer is made from stacks of thin plates of fused silica. When the incident light beam is at the Brewster angle, the reflected light beam is linearly polarized with its electric vector parallel to the plane of the reflecting surface and the transmitted beam is partially linearly polarized perpendicularly to the polarization of the reflected beam.

Each of the mercury absorption cells 14 and 15 is also subjected to an AC $H_1$ field produced by field coils (not shown). The $H_1$ fields are perpendicular to the $H_o$ fields and the readout beams, as shown in FIG. 2.

The $H_1$ field applied to cell 14 is produced by the field generator 16 in circuit with the output of the spin generator 11 while the $H_1$ field applied to cell 15 is produced by the field generator 19 in circuit with the output of the spin generator 12. Each field generator 16 and 19 includes a phasestable amplifier for receiving and amplifying the output of its respective photodetector, and a field coil oriented with respect to the absorption cell which produces an $H_1$ field along the axis of the field coil and perpendicular to the $H_o$ field.

The alternating magnetic field $H_1$ has the effect of applying a torque to the net magnetic moment of the mercury in the absorption cell, causing it to tilt away from the $H_o$ field and to process about the axis of the $H_o$ field at the frequency of the applied $H_1$ field. The Larmor precessional frequency is given by:

$$\omega = -\gamma H_o \qquad (4)$$

where $\omega$ is the Larmor precession frequency, $\gamma$ is the gyro magnetic ratio, and $H_o$ is the applied DC magnetic field. The negative sign in equation (4) demonstrates that a nucleus with a positive gyromagnetic ratio will precess in a counterclockwise direction when viewed along a direction parallel to the direction of $H_o$, i.e., according to the left-hand rule with the thumb in the direction of $H_o$ and the fingers in the direction of $\omega$.

The precessing magnetic moment will have a component which is perpendicular to the $H_o$ field and may be considered to rotate about the axis of the $H_o$ field.

The readout beams 38 and 37 pass through respective halfwavelength plates to the mercury cells 14 and 15, respectively, and the angle of the plane of polarization is modulated at the precessional frequency by the Faraday effect on the readout beam caused by the perpendicular or transverse magnetic moment component rotating about the $H_o$ axis. The modulation of the angle of the plane of polarization of the readout beam 38 is converted to an amplitude modulation by passing the polarization modulated beam through the linear analyzer 42 and the amplitude modulation is detected in the photomultiplier 43. Similarly, the readout beam 37 is polarization modulated in the mercury cell 15 and is passed through the linear analyzer 45 and is detected in the photodetector 46. The output current from each of the photodetectors is amplified and used to generate the alternating field $H_1$.

When all of the conditions of loop closure (such as proper gains and no phase shifts) are met precisely, each of the mercury isotopes in the spin generators 11 and 12 will cause the spin generator to oscillate at its respective Larmor precessional frequency as indicated above.

When a beam of plane polarized light having a direction of propagation parallel to a component of magnetization of a magnetized medium is caused to pass through the medium, the plane of oscillation of the light may be rotated through an angle as a result of the Faraday effect. When a plane polarized beam 38 of light is caused to pass through the mercury cell 14, it will be affected by a magnetic moment component rotating at the Larmor frequency about the $H_o$ axis and as a result the angular orientation of the plane of polarization of the light will oscillate with respect to time at the Larmor frequency. Thus, the polarization angle of the light beams 37 and 38 will be modulated by the cells 15 and 14, respectively. The analyzers 45 and 42 convert this polarization angle modulation to intensity modulation. By properly orienting the direction of the analyzers 45 and 42, the components of this intensity modulation at a Larmor frequency can be maximized.

Since two isotopes of mercury are contained within each absorption cell, two such signals are produced by each absorption cell, each having been modulated at the characteristic Larmor precessional frequency in accordance with the gyromagnetic ratio for each isotope. Thus, the net output signal is amplitude modulated simultaneously at two frequencies which correspond to each of the characteristic frequencies of the isotopes in the mercury cell.

Thus far, the gyroscope operation has been described for a gyroscope which is fixed in inertial space.

When the gyroscope rotates about the $H_o$ axis, the phase relationships are affected in accordance with equation (1) above. That is, the relative phase of the signal at each frequency at the output of each spin generator after rotation is displaced in phase from the signal which would have been received under non-rotation conditions. This relative displacement is thus used to provide an output representative of the degree of rotation of the gyroscope.

FIG. 3 illustrates an improved optical configuration, embodying the present invention, for generating the pump beam. Pump lamp 50 departs from the prior art in that the pump lamp includes a different isotope, preferably $^{199}$Hg in place of the conventional $^{204}$Hg. This may be adjusted by adding a small amount of $^{204}$Hg or $^{198}$Hg if more light is wanted in the $^{201}$Hg(a) or (b) hyperfine regions, respectively. For a preferred embodiment a mixture of 84%±5% $^{199}$Hg and 16%±5% $^{204}$Hg has been found to reduce substantially alignment moment pumping. Alternately, a $^{204}$Hg filter (not shown) could reduce the amount of light from the $^{199}$Hg(a) hyperfine component reaching the $^{201}$Hg(a) hyperfine absorption region without affecting the $^{199}$Hg(b) region. The pump lamp 50 is positioned in proximity with a SmCo magnet for generating an axial DC magnetic field. A housing 54 encloses the magnet 52 and the pump beam from lamp 50 experiences Zeeman splitting wherein each pump lamp spectral line is split into two or more lines. An aperture 56 is formed in the housing 54 from which the beam 58 emerges. A quarter-wavelength plate 60 is positioned between the lamp 50 and a Brewster stack reflective polarizer 66. Each hyperfine line of the lamp spectrum is split into circularly polarized components of opposite circular polarization senses due to the axial magnetic field. By suitably orienting the optical axis of quarter-wave retardation plate 60, either of these components singly, or any combination of them may be selected as the light linearly polarized in the proper orientation to be reflected by polarizer 66. Thus, by adjusting the strength of the Faraday splitting magnetic field and the orientation of waveplate 60, the pump lamp spectrum may be fine-tuned through the absorption spectrum of the atoms in cells 14 and 15 in order to achieve a balance among desired parameters including reduction of alignment moments and reduction of the effects of light induced frequency shifts. The polarized reflected beam 68 undergoes a 50%-50% beam splitting at a second Brewster stack 70 which splits beam 68 into two derivative beams 72 and 74. In a preferred embodiment of the invention, the polarizer 66 includes five plates while the stack 70 includes four plates. By dividing the reflective polarizer and splitter functions of components 66 and 70, instead of utilizing a single Brewster stack for both purposes, equal beam intensities and polarization qualities along beams 72 and 74 are realized, despite variations in the polarization of the light from lamp 50. Respective quarter-wavelength plates 76 and 78 are inserted in beams 72 and 74 prior to impinging upon the cells 14 and 15.

The quarter-wavelength plates 76 and 78 produce circularly polarized light for optical pumping in the cells 14 and 15. These plates act in a similar manner to plates 32 and 33 of the prior art structures of FIG. 1.

Referring to FIG. 4, the basic optical configuration for readout is illustrated. A lamp 80 is mounted in proximity with a magnet 81 which is identical to magnet 52, previously discussed. With readout lamp 80, $^{202}$Hg is employed. The hyperfine spectrum of the light from $^{202}$Hg lamp 80 lies outside the region of strong absorption by $^{199}$Hg and $^{201}$Hg. The readout beam 82 progresses through a quarter-wavelength plate 84, identical to plate 60 (FIG. 3), to an interference filter 86, which preferably has a band pass center of 253.7 nm. The interference filter defines the portion of the spectrum to be used, thereby eliminating unmodulated light and thus increasing the signal-to-noise ratio of the gyro output. A filter cell 88 then follows which preferably contains $^{199}$Hg+$^{201}$Hg and a trace of $^{202}$Hg. This further reduces the amount of readout light absorbed by the atoms in cells 14 and 15, thereby further reducing the tendency of readout light to produce relaxation of the orientation moments. A Brewster stack reflective polarizer 90, identical to polarizer 66 previously discussed, reflects the beam 92 to Brewster stack 94, identical with stack 70, previously discussed. The beam is split along paths 96 and 98 to respective half-wavelength plates 100 and 102 which set the plane of polarization in preferred direction. As in the case of the pump beam configuration, the controllable axial magnetic field at the lamp and the quarter-wave plate 84 in combination permit the readout beam spectrum to be fine-tuned over a region on either side of the nominal position of the $^{202}$Hg hyperfine component. While readout beam spectral control does not affect the size of the alignment moment, it is useful in reducing readout beam light-induced-frequency-shift effects and in improving signal-to-noise. This combination of components also has the beneficial attributes of eliminating unbalance between the beams due to spontaneous polarization changes which may occur in the readout lamp 80, and of improving the symmetry of polarization quality between the two readout beam paths 96 and 98. The readout beams then penetrate the cells 14 and 15. The beams 104 and 108 passing through the absorption cells 14 and 15, respectively, impinge upon analyzers 106 and 110, respectively. These analyzers may be fabricated from Brewster stacks of silica plates. As will be observed, the beam 104 splits into beams 112 and 114 which are read by conventional push-pull photodetectors 116 and 118. The outputs from the photodetectors drive a push-pull or differential amplifier 128, the output of which goes to electrical filters shown in FIG. 5. In a similar fashion, the beam 108, from absorption cell 15, is split by analyzer 110 into two derivative beams 120 and 122. These latter-mentioned beams impinge upon push-pull photodetectors 124 and 126 which drive the push-pull amplifier 130. The output from the amplifier is connected to the electrical filters shown in FIG. 5.

Figure 5:
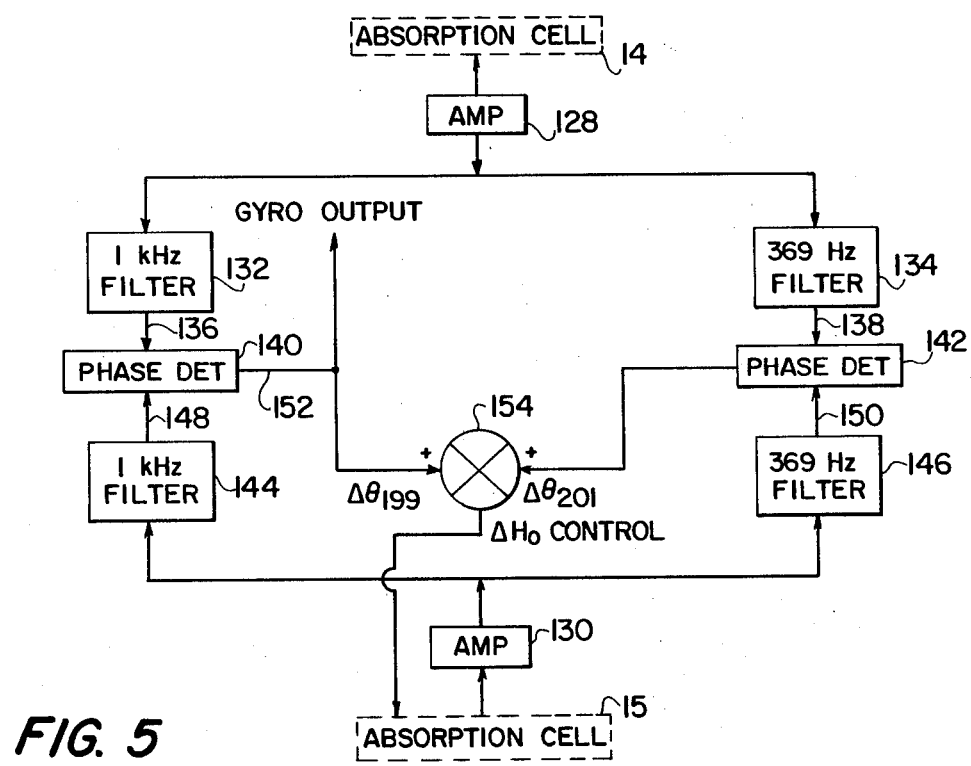
FIG. 5 is a block diagram of the circuit for comparing the phase of signals from respective spin generators of the present invention and generating a gyro signal therefrom.

Turning now to FIG. 5, the schematic diagram shows the phase measurement and control system that provides the gyro output. The two resonance signals from absorption cell 14 are separated by use of narrow band pass filters 132 and 134. Filter 132 is a 1 kHz band pass filter and filter 134 is a 369 Hz band pass filter. These are preferably of the digital phase-locked-loop type. The $^{199}$Hg signal is at 1 kHz and the $^{201}$Hg signal is at 369 Hz. After filtering, the output from filters 132 and 134 respectively drive inputs 136 and 138 of phase difference detectors 140 and 142. The phase difference detectors may be of conventional design, but are preferably of the digital type as disclosed in pending application Ser. No. 144,717 by Lincoln S. Ferris, assigned to the present assignee. Similarly, the signal outputs from absorption cell 15 are separated by use of narrow band pass filters 144 and 146, which generate signals at the inputs 148 and 150 of the respective phase difference detectors 140 and 142. The phase difference detector output 152 develops $\Delta\theta_{199}$ while the phase difference detector 142 develops $\Delta\theta_{201}$. These delta signals are combined in adder 154 to develop the differential magnetic field control signal $\Delta H_o$ to bring the loop back to a null condition. The output 152 from phase difference detector 140 may be directly tapped as the gyro output.

From the foregoing, a nuclear gyroscope has been described which utilizes a mixture of $^{199}$Hg and $^{204}$Hg in the pump lamp and other optical components in combination as discussed in connection with FIGS. 3 and 4 which assist in controlling the spectrum of the pump and readout beams, thus resulting in reduced alignment moments, improved beam balances, and reduced light-induced-frequency-shift effects thereby improving the rate bias stability of the gyro output.

For some applications, gyroscopes of reduced complexity and performance are desired. For these cases, a single-cell gyroscope may be the preferred embodiment. For such a gyroscope, the effect of the second cell on the signal processing may be simulated by conventional digital processing means. The physical arrangement would be described by FIG. 3 with components 70, 74, 78, and 15 deleted and by FIG. 4 with components 94, 98, 15, 108, 110, 120, 122, 124, 126, and 130 deleted. Such a simplified configuration would have the attributes enumerated above except for those arising from balancing effects between two cells.

It should be understood that the invention is not limited to the exact details of construction shown and described herein for obvious modifications will occur to persons skilled in the art.

I claim:

1. In a magnetic resonance gyro having at least two resonance cells, a pump beam generator comprising:
    a pump lamp including the isotope $^{199}$Hg therein;
    reflective means for linearly polarizing light from the lamp and positioned downbeam of the lamp;
    means for splitting the polarized beam into two beams of substantially equal intensity for transmission into the absorption cells;
    a readout lamp including at least one Hg isotope therein;
    means for polarizing the light from the readout lamp;
    means transmitting the polarized light through the absorption cells; and
    differential push-pull means for detecting the light readout from the cells.

2. The structure of claim 1 together with a quarter-wavelength plate located between the said pump lamp and the said reflective polarizing means.

3. In a magnetic resonance gyro having at least two resonance cells, a pump beam generator comprising:
    a pump lamp including the isotope $^{199}$Hg therein;
    reflective means for linearly polarizing light from the lamp and positioned downbeam of the lamp;
    means for splitting the polarized beam into two beams of substantially equal intensity for transmission into the absorption cells;
    means for Zeeman splitting the beam from the lamp;
    a quarter-wavelength plate located between the said pump lamp and the said reflective polarizing means;
    a readout lamp including at least one Hg isotope therein;
    means for polarizing the light from the readout lamp;
    means transmitting the polarized light through the absorption cells; and
    differential push-pull means for detecting the light readout from the cells.

4. In a magnetic resonance gyro having at least two resonance cells, a pump beam generator comprising at least two absorption cells:
    a pump lamp including the isotope $^{199}$Hg therein;
    reflective means for linearly polarizing light from the lamp and positioned downbeam of the lamp;
    means for splitting the polarized beam into two beams of substantially equal intensity for transmission into the absorption cells;
    a readout lamp including at least one Hg isotope therein;
    means for polarizing the light from the readout lamp;
    means transmitting the polarized light through the absorption cells; and
    means for detecting the light readout from the cells.

5. The structure of claim 4 together with a quarter-wavelength plate located between the said pump lamp and the said reflective polarizing means.

* * * * *